United States Patent [19]

Bartmann

[11] Patent Number: 4,727,130
[45] Date of Patent: Feb. 23, 1988

[54] THERMOPLASTICALLY PROCESSIBLE AROMATIC POLYAMIDES WITH CHEMICALLY INCORPORATED ETHER AND SULFONYL GROUPS; AND METHOD OF MANUFACTURING THE SAME

[75] Inventor: Martin Bartmann, Recklinghausen, Fed. Rep. of Germany

[73] Assignee: Hüls Aktiengesellschaft, Marl, Fed. Rep. of Germany

[21] Appl. No.: 905,124

[22] Filed: Sep. 9, 1986

[30] Foreign Application Priority Data

Nov. 9, 1985 [DE] Fed. Rep. of Germany ....... 3539846

[51] Int. Cl.$^4$ .............................................. C08G 69/28
[52] U.S. Cl. ..................................... 528/172; 528/173; 528/179; 528/182; 528/185; 528/336; 528/337; 528/348
[58] Field of Search ............... 528/172, 173, 179, 182, 528/185, 336, 337, 348

[56] References Cited

U.S. PATENT DOCUMENTS 3,505,288  4/1970  Bodesheim et al. ................. 528/172
3,859,252  1/1975  Cho ..................................... 528/172

*Primary Examiner*—Harold D. Anderson

*Attorney, Agent, or Firm*—Oblon, Fisher, Spivak, McClelland & Maier

[57] ABSTRACT

This invention relates to a method of manufacturing aromatic polyamides having general formula

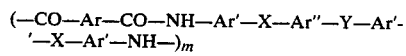

where Ar, Ar', and Ar'' each represent an m- or p-phenylene group, possibly substituted with alkyl groups having 1 to 4 carbon atoms; and X is O and Y is $SO_2$ or X is $SO_2$ and Y is O. In the present method, isophthalic and/or terephthalic acids are reacted with diamines of the formula

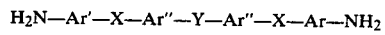

in the presence of a catalytic amount of an acid derived from phosphorus and having formula $H_3PO_n$ (where n=2, 3 or 4), or in the presence of triphenyl phosphite, and possibly in the presence of a 4-dialkylaminopyridine, in a polar, aprotic, organic solvent, at temperatures between 160° and 300° C.

6 Claims, No Drawings

THERMOPLASTICALLY PROCESSIBLE AROMATIC POLYAMIDES WITH CHEMICALLY INCORPORATED ETHER AND SULFONYL GROUPS; AND METHOD OF MANUFACTURING THE SAME

BACKGROUND OF THE INVENTION

1. Field of the Invention

The aromatic polyamides having formula I

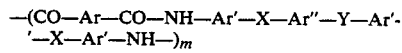
—(CO—Ar—CO—NH—Ar'—X—Ar''—Y—Ar'''—X—Ar'—NH—)$_m$ are distinguished not only by high temperature stability and good mechanical properties but also by thermoplastic processibility (see Elias and Vohwinkel, 1983. "New polymeric materials for industrial use"; published in German, as "Neue polymere Werkstoffe fuer die industrielle Anwendung", 2nd Ed., pub. Carl Hanser Verlag, pp. 242).

DISCUSSION OF THE BACKGROUND

Known methods for preparing aromatic polyamides are:

1. Low temperature solution polycondensation by reacting aromatic dicarboxylic acid dichlorides with aromatic diamines in polar solvents (U.S. Pat. Nos. 3,287,324, 3,541,056, 3,600,350, 3,819,587, 3,767,756, 3,869,429, 3,673,143, 3,817,941, 3,063,966 and German AS No. 22 19 703).

The claimed matter in U.S. Pat. No. 3,859,252 comprises thermoplastic condensation polymers with an aromatic bisamide structure. The compound corresponds to formula I above, with R=H, X=SO$_2$, and Y=O. It is prepared from isophthaloyl chloride and the corresponding diamine III (see below).

2. Interface polycondensation by reaction between an aromatic dicarboxylic acid dichloride and an aromatic diamine at the interface between an organic and an aqueous phase (German OS No. 19 08 297 and OS No. 23 25 139, German Pat. No. 3,006,899.

Aromatic polyamides can also be prepared by the reaction of aromatic dicarboxylic acids with aromatic diisocyanates (German OS No. 19 28 435) or by reaction of aromatic dicarboxylic acid diaryl esters with aromatic diamines.

Brode et al describe the preparation of 4,4'-{sulfonyl-bis(p-phenyleneoxy)}dianiline (See compound III below with X=O and Y=SO$_2$) from p-aminophenol and 4,4'-dichlorodiphenylsulfone, and condensation of this product with aromatic acid chlorides such as terephthaloyl chloride, to form aromatic polyamides with glass transition temperatures (Tg) between 230° and 320° C. (See 1974 Polymer Prep. Am. Chem. Soc. Div. Pol. Chem. 15: 761, and 1975 Adv. Chem. Ser. 142; See also Chemical Abstracts 84 005530s and 83 193186f).

In Japan OS 78/104,695, OS 79/77,693, and OS 81/99,227 (see Chemical Abstracts 90 104612a, 91 212148h, and 95 204677x), the reaction of mixtures of iso- and terephthaloyl chlorides and/or anhydrides with aromatic diamines of formula III are described.

Also, the polyamides, polyimides, and polyamidimides synthesized by Adduci et al are obtained exclusively by reacting the acid chloride or the acid anhydride with the corresponding diamines III (see 1981 Polym. Eng. Sci. 21: 712, and 1983 J. Appl. Polym. Sci. 28: 2069).

These methods have the disadvantage that they depend on the use of activated, difficult to handle monomers, for example, dicarboxylic acid chlorides and dicarboxylic acid anhydrides.

Methods are also known in which aromatic polyamides are prepared directly by reaction of aromatic dicarboxylic acids with aromatic diamines in the presence of aromatic phosphites. Solvents which have proven practical for such methods are N-methylamides, particularly N-methylpyrrolidone. If other dipolar aprotic solvents are used, for example, dimethylsulfoxide, no polymeric amides are obtained (see F. Higashi et al., 1980 J. Polym. Sci., Polym. Chem. Ed., 18: 1711).

From a review article (S. M. Aharoni et al., 1984 J. Polym. Sci. Polym. Chem. Ed. 22: 2579), it is concluded that:

(a) The molecular weight of the amides can be increased by adding lithium chloride or calcium chloride;

(b) The phosphite employed must contain aryl groups, and is preferably triphenyl phosphite;

(c) The aryl phosphites must be employed in a quantity at least such that 1 mole of a compound containing the group

Ar—O—P< interacts with 1 mole of the amide being produced because the group noted above is consumed in the course of the reaction, and this reaction provides the driving force for the overall conversion;

(d) The optimum temperature range for carrying out this reaction is 80°–100° C., whereas at temperatures appreciably greater than 100° C. the molecular weight is substantially less; and (e) Pyridine is not required for the reaction, but it does have an accelerating effect on the progress of the reaction.

In Eur. OS No. 0 099 997, a method of producing aromatic polyamides is described in which aromatic dicarboxylic acids are reacted with aromatic diamines in a polar solvent in the presence of a dehydration catalyst, for example, a phosphorous containing compound. The polyamides disclosed cannot be thermoplastically processed because of their high softening temperatures, which are in the range of the decomposition temperatures or even higher. Studies carried out by the present applicant indicate that satisfactory results are not obtained with triethyl or triphenyl phosphite or with a phosphorus-containing acid, for example, hypophosphorous acid, as catalyst, and sulfolane as solvent. The products, which are obtained after 3–12 hr, have poor color quality. If electron-rich aromatic diamines are used, e.g. 4,4'-diaminodiphenyl ether, high molecular weight products are obtained only after long reaction times, and the products are strongly colored due to the formation of unidentified byproducts. If electron-poor diamines are used, e.g., 4,4'-diaminodiphenyl sulfone, the method of Eur. OS 0 099 997 fails completely. The only products which can be prepared are strongly colored oligomers.

Thus the indication from the state of the art is that the preparation of high molecular weight aromatic amides depends on numerous parameters in a manner which is sensitive and still not well understood. It does not seem possible to produce high molecular weight polyamides of acceptable color quality in a direct fashion, by reacting aromatic diamines with aromatic dicarboxylic acids.

SUMMARY OF THE INVENTION

Accordingly, one object of this invention is to provide a novel method for producing high molecular weight polyamides of acceptable color quality.

A further object of the invention is to produce high molecular weight polyamides by reacting aromatic diamines with aromatic dicarboxylic acids in a direct fashion.

These objects and other objects of the invention which will become apparent from the following specification have been achieved by the novel method of the present invention in which an approximately equimolar mixture of an aromatic dicarboxylic acid having formula II is reacted with an aromatic diamine having formula III, in the presence of at least a catalytically effective amount of triphenyl phosphite or an acid derived from phosphorus and having formula $H_3PO_n$ ($2 \leq n \leq 4$), or a catalytically effective amount of a mixture of the aforementioned phosphorus compounds and a 4-dialkylaminopyridine, in a polar aprotic solvent at temperatures between 160° and 300° C.

HOOC—Ar—COOH +
(II)

$H_2N$—Ar'—X—Ar''—Y—Ar''—X—Ar'—$NH_2$ 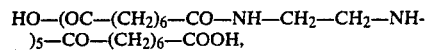
(III)

+CO—Ar—CO—NH—Ar'—X—Ar''—Y—Ar''—X—Ar'—NH$)_m$
(I)

The values of m in formula I are $3 < m < 300$, and preferably $10 < m < 100$.

BRIEF DESCRIPTION OF THE PREFERRED EMBODIMENTS

According to the data of S. M. Aharoni et al a stoichiometric amount of a phosphorus compound is required to prepare an aromatic polyamide. It is surprising, therefore, that according to the present invention it has been discovered that not only will catalytic amounts initiate the reaction but they lead to substantially better results.

The addition of a small amount of 4-dialkylaminopyridine has the following major effects on the formation of the polyamide:

(1) The J-value, which amounts to a measure of the molecular weight is substantially increased;
(2) The color quality of the polymers is greatly improved;
(3) The time for polycondensation is greatly reduced; and
(4) The yield is greater.

According to the present invention, the following aromatic dicarboxylic acids or mixtures of these acids may be used: isophthalic acid, terephthalic acid, and derivatives of these having an alkyl group substituent with 1 to 4 C atoms.

Up to 40 mol% of these aromatic dicarboxylic acids (namely isophthalic acid, terephthalic acid, and the above-mentioned alkyl derivatives of the same) may be replaced by the following acids:

(i) Aliphatic dicarboxylic acids or anhydrides of the same, with 2 to 12 C atoms;
(ii) Aliphatic oligoamides with terminal carboxylic acid groups, obtained by reacting aliphatic $C_{2-12}$ dicarboxylic acids with lactams and polyalkylenepolyamines with up to 5 amino groups and up to 12 C atoms; and/or
(iii) Aromatic tri- and tetracarboxylic acids or anhydrides of the same, with 9 to 22 C atoms.

Examples which might be mentioned are: maleic acid anhydride, an oligoamide prepared from 5 moles ethylenediamine and 6 moles hexanedicarboxylic acid, and having the formula:

HO—(OC—$(CH_2)_6$—CO—NH—$CH_2$—$CH_2$—NH-$)_5$—CO—$(CH_2)_6$—COOH, an oligoamide prepared from 10 moles lauryllactam and 1 mole dodecanedicarboxylic acid, trimellitic acid anhydride, and pyromellitic acid anhydride.

According to the invention the following aromatic diamines or mixtures of same may be employed: 4,4'-bis(4-aminophenoxy)diphenyl sulfone (compound with formula III, with X=O and Y=$SO_2$, also called "BAPS"); and 4,4'-bis(4-aminophenylenesulfonyl)diphenyl ether (compound with formula III, with X=$SO_2$ and Y=O).

"BAPS" may be prepared by reacting p-aminophenol with 4,4'-dichlorodiphenyl sulfone.

The preparation of 4,4'-bis(4-aminophenylenesulfonyl)diphenyl ether is described in U.S. Pat. No. 3,850,252.

Up to 40 mol% of these aromatic diamines may be replaced by the following amines: aliphatic di- and polyamines with 2 to 12 C atoms, and aliphatic oligoamides with terminal $NH_2$ groups obtained by reacting the above-mentioned aliphatic di- and/or polyamines with lactams or aliphatic di- and/or polycarboxylic acids.

Examples include 1,12-n-dodecanediamine and "oligoamide-12-diamine", which is prepared by polymerization of 10 moles of lauryllactam in the presence of 1 mole 1,6-n-hexanediamine.

The reaction of the aromatic dicarboxylic acids II with the diamines III is carried out in the presence of a catalytic amount of a phosphorus-containing compound or in the presence of a catalytic amount of a mixture of said phosphorus-containing compound and a 4-dialkylaminopyridine.

Suitable phosphorus-containing compounds include triphenyl phosphite, hypophosphorous acid, phosphorous acid, and phosphoric acid.

The 4-dialkylaminopyridines used as cocatalysts have the structure

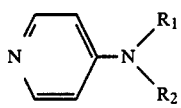

where R1 and R2, independently, represent an alkyl group with 1 to 10 C atoms, or else together R1 and R2 represent a pyrrolidine or piperidine ring which contains the amino nitrogen.

Preferred 4-dialkylaminopyridines are: 4-dimethylaminopyridine; 4-dibutylaminopyridine; 4-di-n-hexylaminopyridine; and 4-piperidinylpyridine.

The pyridine derivatives can be prepared according to known methods (see 1978 Synthesis 844).

In each case 0.1 to 10 moles preferably 1 to 5 moles of the phosphorous-containing compound and the 4-dialkylaminopyridine, or of the phosphorus-containing compound alone, are used per 100 moles of the dicarboxylic acid employed. The polycondensation is carried out at a temperature of 160° to 300° C., preferably between 210° and 260° C.

Ordinarily, the reaction is carried out under inert gas at normal pressure. However, if for some reason it is desirable, a slight gauge pressure or vacuum may be employed. The reaction times required to produce a satisfactory amount of high molecular weight products are in the range of 1 to 4 hr.

The preferred solvents for use as the reaction medium are polar, aprotic, organic solvents capable of dissolving the products and the polymeric amides to a sufficient extent, at least at 180° C. Examples of suitable solvents are N-methyl-2-pyrrolidone ("NMP"), N-methyl-3-caprolactam, N,N-dimethylacetamide, dimethyl sulfoxide, sulfolane (tetrahydrothiophene dioxide), and diphenyl sulfone. These solvents may be used alone or in mixtures.

Examples of other solvents which can be employed in combination with the above-mentioned polar, aprotic solvents are chlorobenzene, dichlorobenzene, nitrobenzene, diphenyl ether, anisole, phenol, and m-cresol. In such mixtures, the amount of the aprotic, polar solvent or solvents should be 20 wt.%. The preferred solvent is sulfolane.

In the preferred method, the solution, comprising approximately equimolar amounts of aromatic dicarboxylic acid and aromatic diamine, is heated in the presence of the phosphorus-containing compound and possibly in the presence of the 4-dialkylaminopyridine. This solution generally has a solids content of 5–50 wt.%. This step is carried out in an inert gas atmosphere at between 200° and 260° C. The temperature is maintained for about 1 to 3 hr, and then the polyamide is isolated by ordinary techniques.

In order to produce products having sufficiently high molecular weight it is necessary to remove the water formed during the polycondensation from the reaction system. Ordinarily this is accomplished to an adequate degree by the passing of inert gas over or through the reaction mixture. A vacuum may also be applied, and/or part of the solvent may be driven off along with the water by means of azeotropic distillation.

At the end of the polycondensation, a more or less viscous solution, or a suspension of the polymer in the solvent which was employed is obtained. The isolation of the aromatic polyamides from this solution or suspension is not critical. They may be sent directly to further processing or alternatively they may be precipitated out by addition of an antisolvent, possibly after a preliminary dilution.

Candidates for use as antisolvents include lower alcohols, for example methanol, ethanol, and isopropanol; ketones, for example acetone and methyl ethyl ketone; water and mixtures of these.

The precipitated product, which is generally in the form of a powder, may be processed to form a film by pressing at high temperature (>200° C.). Alternatively, a film can be produced by film-molding from organic solutions of the polyamides in suitable aprotic polar solvents using customary techniques.

Other features of the invention will become apparent in the course of the following descriptions of exemplary embodiments which are given for illustration of the invention and are not intended to be limiting thereof.

EXAMPLES

Example 1

Starting materials:
isophthalic acid—9.96 g (0.06 mole)
4,4'-Bis(4-aminophenoxy)diphenyl sulfone ("BAPS-')—25.92 g (0.06 mole)
Triphenyl phosphite—0.35 g
4-Dimethylaminopyridine—0.30 g
Sulfolane—60 ml.

Procedure:

The starting materials were charged into a stirred vessel, and all traces of oxygen were removed by five-fold evacuation followed each time by reintroduction of nitrogen. The mixture was then thoroughly mixed and purged with nitrogen (100 liter/hr) at 130° C. internal temperature. The mixture was then heated to a temperature of 230° C. over a period of 60 min. After further polycondensation for 120 min at 230° C. and 180 min at 250° C., followed by cooling to 150° C., the mixture, now quite viscous, was diluted with 250 ml dimethylformamide, and the product was precipitated out by stirring into 500 ml methanol. The resulting precipitate was subjected to suction filtration, washed with methanol, and dried at 80° C. in an oil-pump vacuum.
Yield—31.2 g
J-value—64 cm$^3$/g (in m-cresol)
Color—white
Tg—250° C. (by differential scanning calorimetry, "DSC").

The product can be pressed to form a flexible film at 310° C.

Example 2

Starting materials:
isophthalic acid—9.96 g (0.06 mole)
BAPS—25.92 g (0.06 mole)
Hypophosphorous acid—0.50 g
Sulfolane—60 ml.
Procedure: Analogous to Example 1.
Polycondensation time
  120 min at 230° C.;
  180 min at 250° C.
Yield—31.5 g
J-value—71 cm$^3$/g (in m-cresol);
Color—white
Tg—250° C.

The product can be pressed to form a flexible film at 310° C.

Example 3

Starting materials:
isophthalic acid—6.98 g (0.042 mole)
Terephthalic acid—3.00 g (0.018 mole)
BAPS—25.92 g (0.06 mole)
Triphenyl phosphite—0.35 g
4-Dimethylaminopyridine—0.30 g
Sulfolane—60 ml.
Procedure: Analogous to Example 1.
Polycondensation time
  120 min at 230° C.;
  150 min at 250° C.
Yield—31.2 g
J-value—65 cm$^3$/g (in m-cresol)
Color—white The product can be pressed to form a flexible film at 230° C.

Example 4

Starting materials:
isophthalic acid—9.96 g (0.06 mole)
4,4'-Bis(4-aminophenylenesulfonyl)diphenyl ether—25.92 g (0.06 mole)
Triphenyl phosphite—0.35 g
4-Dimethylaminopyridine—0.30 g
Sulfolane—70 ml.
Procedure: Analogous to Example 1.
Polycondensation time
120 min at 230° C.;
300 min at 250° C.
Yield—33.1 g
J-value—57 cm$^3$/g (in m-cresol)

The product can be pressed to form a flexible film at 330° C.

Example 5

Starting materials:
isophthalic acid—6.74 g (0.040 mole)
BAPS—20.00 g (0.046 mole)

| Oligoamidedicarboxylic acid of formula | |
|---|---|
| HOOC(CH$_2$)$_{11}$HN[C(CH$_2$)$_{11}$NH]$_n$C(CH$_2$)$_{10}$COOH  $\quad\quad$ O $\quad\quad\quad\quad$ O | 11.46 g (0.006 mole) |

Hypophosphorous acid (50%)—0.24 g
Sulfolane—60 g.
Procedure:

The isophthalic acid, BAPS, hypophosphorous acid, and 30 g sulfolane were charged into a stirred vessel and oxygen was removed by fivefold evacuation followed each time by reintroduction of nitrogen. The mixture was then purged with nitrogen (100 liter/hr) under stirring, at 130° C. internal temperature. The mixture was heated to 250° C. over a period of 60 min, the precondensate was cooled to room temperature, and the oligoamidedicarboxylic acid and another 30 g sulfolane were added. After fivefold evacuation and addition each time of nitrogen, the mixture was heated to 250° C. over a period of 15 min. After a further polycondensation time of 110 min, the reaction mixture, which by now was quite viscous, was cooled to 160° C. and diluted with 450 ml dimethylformamide. Methanol (1000 ml) was then stirred into the cooled solution at 50° C. After cooling, the precipitate which formed was subjected to suction filtration washed twice with methanol, and then dried at 100° C. in an oil pump vacuum.
Yield—33.8 g
J-value—86 cm$^3$/g (in m-cresol)
Color—white

Example A

A polyamide was prepared from isophthalic acid and BAPS, with triethyl phosphite as catalyst.
Starting materials:
isophthalic acid—6.64 g
BAPS—17.30 g
Triethyl phosphite—0,275 ml
Sulfolane—70 ml.
Procedure:

A mixture of isophthalic acid, BAPS, triethyl phosphite, and sulfolane was charged into a stirred vessel and heated to 250° C. over a period of 45 min, under stirring and with nitrogen purging (50 liter/hr). After 180 min additional reaction time, the reaction mixture, which had become viscous, was cooled to 50° C. After addition of 100 ml sulfolane and 100 ml N-methylpyrrolidone the reaction mixture was added dropwise to 800 ml methanol with vigorous stirring. Saturation was reached fairly soon, and a sticky poymeric precipitate formed.

The precipitate was redissolved in N-methylpyrrolidone and was reprecipitated from a mixture of methanol and water (80:20 by weight), followed by drying of the precipitate.
Yield—18.5 g (82%)
J-value—21 cm$^3$/g (in m-cresol)

Example B

Starting materials:
isophthalic acid—6.64 g
BAPS—17.30 g
Didecyl phenyl phosphite—0.67 g
Sulfolane—70 ml.
Procedure: Analogous to Example A.
Yield—19.4 g (87%)
J-value—29 cm$^3$/g (in m-cresol).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for producing high molecular weight aromatic polyamide having recurring units of the general formula —(CO—Ar—CO—NH—Ar'—X—Ar''—Y—Ar'—X—Ar'—NH)$_m$— wherein Ar, Ar', and Ar'', independently, represent a meta- or para-phenylene group, unsubstituted or substituted with alkyl groups having 1–4 carbon atoms; and wherein X is O and Y is SO$_2$ or X is SO$_2$ and Y is O; and 3<m<300; comprising the step of:
reacting an acid selected from the group consisting of an unsubstituted or alkyl-substituted isophthalic acid or terephthalic acid, or a mixture of these with a diamine of the formula H$_2$N—Ar'—X—Ar''—Y—Ar''—X—Ar'—NH$_2$;

wherein said reacting step is carried out at temperatures between 160°–300° C. in the presence of a catalytic amount of a compound selected from the group consisting of triphenyl phosphite and a compound having the formula H$_3$PO$_n$, wherein n is 2, 3 or 4; in the presence of a polar, aprotic, organic solvent.

2. The method of claim 1, further comprising carrying out said reacting step in the presence of a catalytic amount of a 4-dialkylaminopyridine.

3. The method of claim 2, wherein said 4-dialkylaminopyridine is 4-dimethylaminopyridine, 4-dibutylaminopyridine, 4-di-n-hexylaminopyridine or 4-piperidinylpyridine.

4. The method of claim 1, wherein said diamine is 4,4'-bis(4-aminophenoxy)diphenyl sulfone or 4,4'-bis(4-aminophenylenesulfonyl)diphenyl ether.

5. The method of claim 1, further comprising substituting up to 40 mol% of said acid with a member selected from the group consisting of aliphatic dicarboxylic acids with 2-12 carbon atoms; aliphatic dicarboxylic acid anhydrides with 2-12 carbon atoms; aliphatic oligoamides with terminal carboxylic acid groups, obtained by reacting aliphatic $C_2$-$C_{12}$ dicarboxylic acids with lactams or polyalkylenepolyamines with up to 5 amino groups and up to 12 carbon atoms; aromatic tricarboxylic or tetracarboxylic acids with 9-23 carbon atoms; and aromatic tricarboxylic or tetracarboxylic acid anhydrides with 9-23 carbon atoms.

6. The method of claim 1, further comprising substituting up to 40 mol% of said diamine with at least one member selected from the group consisting of aliphatic diamines or polyamines with 2-12 carbon atoms; aliphatic oligoamides with terminal $NH_2$ groups, obtained by a reacting said aliphatic diamines or said aliphatic polyamines with lactams or aliphatic dicarboxylic or polycarboxylic acids.

* * * * *